(12) United States Patent
Quant et al.

(10) Patent No.: US 9,731,866 B2
(45) Date of Patent: Aug. 15, 2017

(54) FUEL TANK WITH SUPPORTING ELEMENT

(71) Applicant: Kautex Textron GmbH & Co. KG, Bonn (DE)

(72) Inventors: Frank Quant, Bonn (DE); Thomas Wagner, Kerpen (DE); Harald Lorenz, Bad Neuenahr-Ahrweiler (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 0 days.

(21) Appl. No.: 14/439,935

(22) PCT Filed: Feb. 20, 2014

(86) PCT No.: PCT/EP2014/053331
§ 371 (c)(1),
(2) Date: Apr. 30, 2015

(87) PCT Pub. No.: WO2014/131685
PCT Pub. Date: Sep. 4, 2014

(65) Prior Publication Data
US 2015/0344183 A1    Dec. 3, 2015

(30) Foreign Application Priority Data

Feb. 27, 2013   (DE) .................. 10 2013 003 247

(51) Int. Cl.
*B65D 25/20*    (2006.01)
*B65D 51/16*    (2006.01)
*B60K 15/03*    (2006.01)

(52) U.S. Cl.
CPC ........ *B65D 25/20* (2013.01); *B60K 15/03177* (2013.01); *B65D 51/16* (2013.01);
(Continued)

(58) Field of Classification Search
CPC .. B65D 25/20; B65D 51/16; B60K 15/03177; B60K 15/077; B60K 2015/0344;
(Continued)

(56) References Cited

U.S. PATENT DOCUMENTS 2,407,455 A * 9/1946 Shakesby ............... B64D 37/02
220/653
3,912,107 A * 10/1975 Baumann ............... B65D 90/02
206/524

(Continued)

FOREIGN PATENT DOCUMENTS

EP    2163694 A2    3/2010
EP    2465662 A2    6/2012
(Continued)

OTHER PUBLICATIONS

English language PCT International Search Report and Written Opinion mailed Sep. 12, 2014, received in corresponding PCT Application No. PCT/EP2014/053331, 18 pgs.
(Continued)

*Primary Examiner* — J. Gregory Pickett
*Assistant Examiner* — Brijesh V. Patel
(74) *Attorney, Agent, or Firm* — Grossman Tucker Perreault & Pfleger, PLLC

(57) ABSTRACT

The invention relates to a fuel tank (1) made from thermoplastic material, having a top (2) and a bottom (3), which are supported upon one another via at least one column-shaped supporting element (4), wherein the supporting element (4) is connected positively and/or materially to a wall (6) of the top (2), on the one hand, and to a wall (6) of the bottom (3), on the other hand, in such a way that it can absorb tensile forces caused by a pressure within the tank, wherein the supporting element (4) is designed as a one-piece solid profile which has a ribbed profile, at least in cross section.

13 Claims, 3 Drawing Sheets

Figure 1:
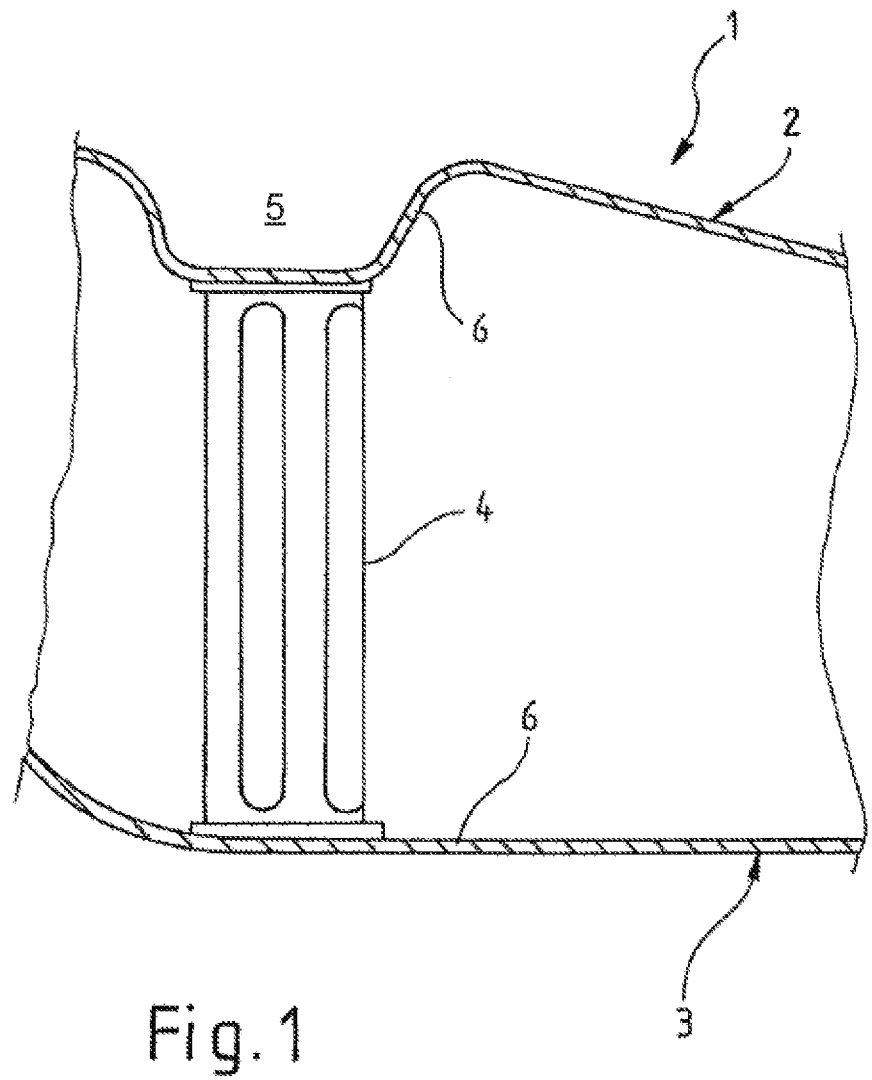

(52) U.S. Cl.
CPC ............... *B60K 2015/0344* (2013.01); *B60K 2015/0346* (2013.01); *B60K 2015/03467* (2013.01); *B60Y 2306/01* (2013.01)

(58) Field of Classification Search
CPC .. B60K 2015/0346; B60K 2015/03467; B60K 2015/0775; B60Y 2306/01
USPC .... 220/4.12–4.14, 4.21, 4.27, 501, 562–564, 220/567.2, 653, 675, 682, DIG. 31; 156/91, 245
See application file for complete search history.

(56) References Cited

U.S. PATENT DOCUMENTS

| | | | | |
|---|---|---|---|---|
| 4,634,028 | A * | 1/1987 | de Larosiere | B65D 25/02 215/10 |
| 6,119,872 | A * | 9/2000 | Flores, Jr. | G11B 33/045 206/310 |
| 6,135,306 | A * | 10/2000 | Clayton | B60K 15/03177 220/501 |
| 6,138,859 | A | 10/2000 | Aulph et al. | |
| 6,857,534 | B1 * | 2/2005 | Keller | B29C 65/20 220/4.13 |
| 7,455,190 | B2 * | 11/2008 | Potter | B60K 15/03177 220/4.12 |
| 8,490,807 | B2 | 7/2013 | Varga | |
| 9,266,285 | B2 | 2/2016 | Tabuchi | |
| 9,266,427 | B2 | 2/2016 | Hill et al. | |
| 2005/0011891 | A1 * | 1/2005 | Austerhoff | B60K 15/03006 220/4.12 |
| 2005/0016600 | A1 * | 1/2005 | Knaggs | B60K 15/03519 137/590 |
| 2011/0139126 | A1 | 6/2011 | Inoue | |
| 2011/0139128 | A1 | 6/2011 | Zhang et al. | |
| 2011/0139793 | A1 | 6/2011 | Park | |
| 2012/0138606 | A1 * | 6/2012 | Varga | B60K 15/03177 220/4.21 |
| 2012/0227237 | A1 * | 9/2012 | Tabuchi | B29C 51/12 29/428 |
| 2012/0325822 | A1 * | 12/2012 | Pozgainer | B60K 15/03177 220/562 |

FOREIGN PATENT DOCUMENTS

| | | |
|---|---|---|
| GB | 2236288 A | 4/1991 |
| JP | 2007106317 A | 4/2007 |
| JP | 2011093408 A | 5/2011 |
| WO | 2012139962 A1 | 10/2012 |

OTHER PUBLICATIONS

English language PCT Notification of Transmittal of International Preliminary Report on Patentability mailed Apr. 8, 2015, received in corresponding PCT Application No. PCT/EP2014/053331, 6 pgs.

* cited by examiner

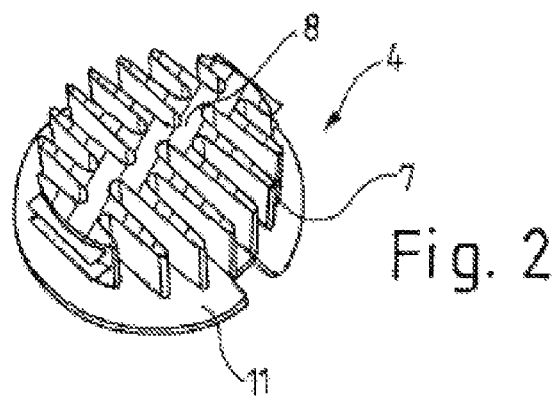
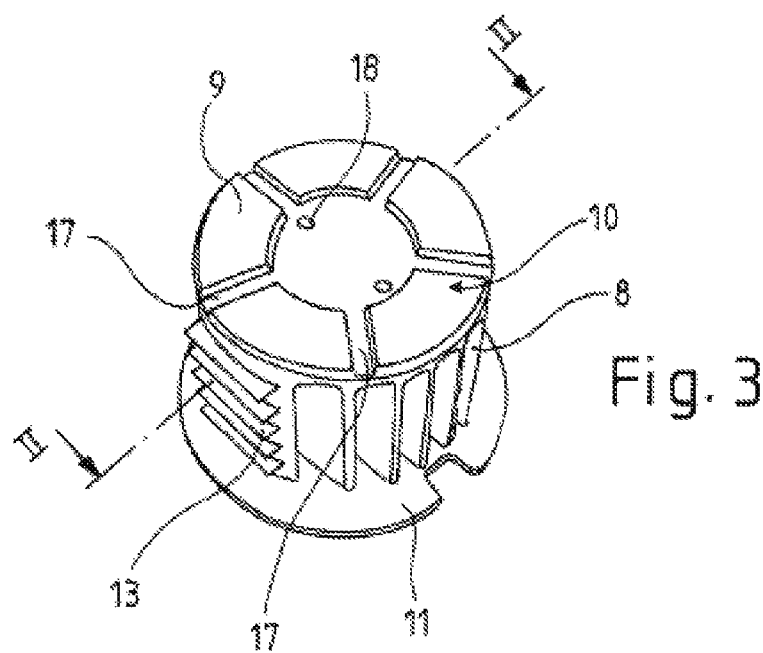
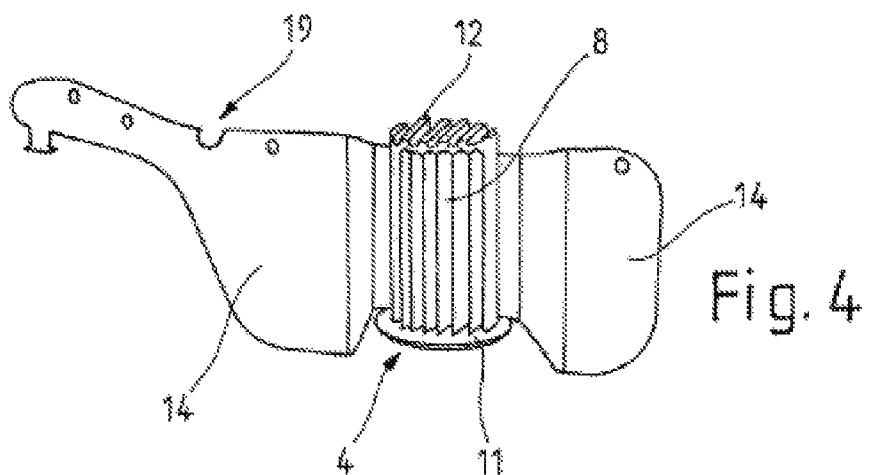

FUEL TANK WITH SUPPORTING ELEMENT

The invention relates to a fuel tank made from thermoplastic material, having a top and a bottom, which are supported upon one another via at least one column-shaped supporting element, wherein the supporting element is connected positively and/or materially to a wall of the top, on the one hand, and to a wall of the bottom, on the other hand, in such a way that it can absorb tensile forces caused by a pressure within the tank.

A fuel tank of this kind is known from DE 10 2009 036 911 A1, for example. The fuel tank described in DE 10 2009 036 911 A1 is reinforced by an internal column. For this purpose, the column consists of a first part and a second part, each connected to the respective shell, one part having notches and the other part having latching hooks, which create a tension-resistant snap joint when joined together. For this purpose, both parts have latching surfaces and deflection surfaces, and the latching hook is capable of flexible movement.

One part of the column consists of four ribs extending in the longitudinal direction and of a number of diaphragms normal to the axis. The ribs do not extend as far as the axis of the column but leave a central space free. Overall, the structure is flexible in torsion in order to allow movement of the latching hooks during the establishment of the joint.

The skeleton structure of the column, in particular, allows it to be flooded with fuel, thereby achieving relatively good use of the volume of the fuel tank.

Fundamentally, it is not desirable that supporting elements of the kind described in DE 10 2009 036 911 A1 should be too rigid since, otherwise, they damage, e.g. pierce or tear, the tank wall owing to deformation forces, in particular shear forces, introduced into the fuel tank as a result of impacts, thus allowing fuel to run out.

WO 2012/139962 A1 discloses a fuel tank having two opposite wall portions and at least one reinforcing element connecting these two wall portions. The reinforcing element comprises a pillar which is connected with two end sections via which the reinforcing element is connected to the opposite wall portions of the fuel tank. The pillar can consist of a series of ribs which are in the same line of draw. The pillar is not designed as a one-piece solid profile so that the ribs are only connecteds to each other via the end sections.

On the other hand, it is in addition desirable, with a view to optimum use of the volume of the fuel tank, to allocate further functions to a supporting element of this kind. For example, a supporting element of this kind can be provided for the purpose of securing other internal fittings in the fuel tank. However, this is difficult, especially if the supporting element is designed in such a way that the parts of the supporting element come into operative connection with one another only when half shells of the tank are joined together. In addition, this also requires a certain minimum stability of the supporting element, which cannot readily be achieved with the supporting element described in DE 10 2009 036 911 A1.

It is therefore the underlying object of the invention to make available a fuel tank of the type stated at the outset with at least one supporting element which is improved with a view to the use of the volume in the fuel tank, in particular, and which simultaneously has adequate stability to enable other internal fittings of the fuel tank, for example, to be secured on said supporting element as well.

It is furthermore the underlying object of the invention to make available a fuel tank of the type stated at the outset, the tank wall of which is stabilized by at least one supporting element, preferably by a plurality of supporting elements, and which is designed in such a way that, overall, the tank does not come to have excessive rigidity in respect of forces acting from the outside.

The object is achieved by the features of claims 1 and 12.

Advantageous embodiments of the invention will emerge from the dependent claims.

According to one aspect of the invention, a fuel tank made from thermoplastic material is provided, having a top and a bottom, which are supported upon one another via at least one column-shaped supporting element, wherein the supporting element is connected positively and/or materially to a wall of the top, on the one hand, and to a wall of the bottom, on the other hand, in such a way that it can absorb tensile forces caused by a pressure within the tank, wherein the supporting element is designed as a one-piece solid profile which has a ribbed profile, at least in cross section. This solid profile can be of substantially torsionally rigid design.

The term "torsionally rigid" in the context of the present application should be taken to mean that the supporting element cannot be twisted upon itself when being fitted in the tank, for example, or indeed in the installed position when impact-induced forces are applied.

The supporting element is either welded or riveted at both ends to the wall of the fuel tank, ensuring that the supporting element counteracts a deformation of the fuel tank due to internal pressure and absorbs tensile forces resulting therefrom.

The supporting element according to the invention is preferably of one-piece design and can be composed to a substantial extent from a hard and brittle thermoplastic or thermosetting plastic, for example.

The abovementioned ribbed profile can be formed continuously in the longitudinal direction of the supporting element, allowing the supporting element to be either injection moulded or extruded. As an alternative, the supporting element could also be sintered.

In an expedient and advantageous embodiment of the fuel tank according to the invention, it is envisaged that the supporting element has welding surfaces formed integrally at the ends.

As a "two-component part", the supporting element can be composed of two different plastics, for example, wherein the material of the welding surfaces is composed of a plastic compatible for weldability with the wall of the tank. The wall of the fuel tank is expediently composed of an extruded thermoplastic based on HDPE. The welding surfaces of the supporting element can likewise be composed of an HDPE or an LDPE. A main body of the supporting element, which extends over the majority of the length of the supporting element, can be composed of a relatively harder plastic, for example, which is resistant to hydrocarbons and has a relatively high rigidity. For example, the main body of the supporting element can be composed of a polyamide or POM.

The welding surfaces preferably have a topography which forms at least one displacement channel for any excess material which may arise during welding. As a result, the softened material displaced at the ends of the supporting element can be displaced sideways during the welding of the supporting element, contributing to improving the quality of the welding surface.

It is advantageous if this ratio of the welding surface area to the cross-sectional area is ≤1.5 at the centre of the supporting element. In this sense, the welding surface area is to be taken to mean the entire surface area that is effective during welding at one end of the supporting element.

To ensure that the supporting element can fail in a defined manner, without damaging the wall of the fuel tank, in the event of a crash, the supporting element can be provided with one or more predetermined breaking points in the form of notches or the like, which allow failure of the supporting element transversely or diagonally to the longitudinal direction thereof.

In another advantageous embodiment of the fuel tank according to the invention, provision can be made for the supporting element to have at least one opening passing through an end face of the supporting element at each end. The vent opening serves to allow any gas trapped in the region of the weld to escape during the joining of the supporting element or during the welding of the supporting element to a wall of the top or of the bottom of the fuel tank, thus ultimately increasing the reliability of the welding process.

It is particularly advantageous if the supporting element has at least one integrally formed baffle. As an alternative, the supporting element can be constructed with radially extending fastening tongues for fastening baffle elements.

It is furthermore possible for the supporting element to have at least one longitudinally extending groove profile or at least one fastening aperture, in which at least one baffle element is latched. The groove profile can also receive a mating profile of a baffle element, said mating profile being inserted into the end of the supporting element.

The supporting element can furthermore have fastening means for fastening other internal fittings of the fuel tank. Such fastening means can be further groove profiles, fastening openings or retention clips provided on the supporting element, which can also receive lines laid in the fuel tank, for example.

As already mentioned at the outset, it is advantageous if the supporting element is designed as a two-component part made from different plastics, wherein the welding surfaces are made from a thermoplastic material compatible for weldability with the wall of the bottom and/or top, whereas a main body of the supporting element is composed of a relatively harder plastic.

It is furthermore particularly advantageous if the supporting element extends between a dome-shaped recess in the top and the bottom or between a dome-shaped recess in the bottom and the top or between a dome-shaped recess in the top and an oppositely arranged recess in the bottom. This gives the relevant wall of the fuel tank an arched structure which allows an optimum flow of force from the tank wall into the supporting element during the welding of the supporting element to the relevant wall. This contributes to the possibility of reducing the number of supporting elements where there is a need to support the walls of the fuel tank upon one another by means of several supporting elements, while maintaining the same load-bearing capacity of the top and/or of the bottom.

According to another aspect of the invention, a fuel tank made from thermoplastic material is provided, having a top and a bottom, which are supported upon one another via at least one column-shaped supporting element, preferably via a plurality of column-shaped supporting elements, wherein the supporting element is welded at the respective ends to a wall of the top and to a wall of the bottom, wherein the supporting element extends between at least one dome-shaped recess in the wall of the top and the bottom or in the wall of the bottom and the top or between dome-shaped recesses in the wall of the top and the wall of the bottom.

The wall of the top and/or of the bottom is preferably arched in the region of the recess with a radius which corresponds approximately to the depth of the recess.

Such a degree of arching has proven particularly advantageous in respect of the flow of force between the top and the supporting element or between the bottom and the supporting element.

Figure 5:
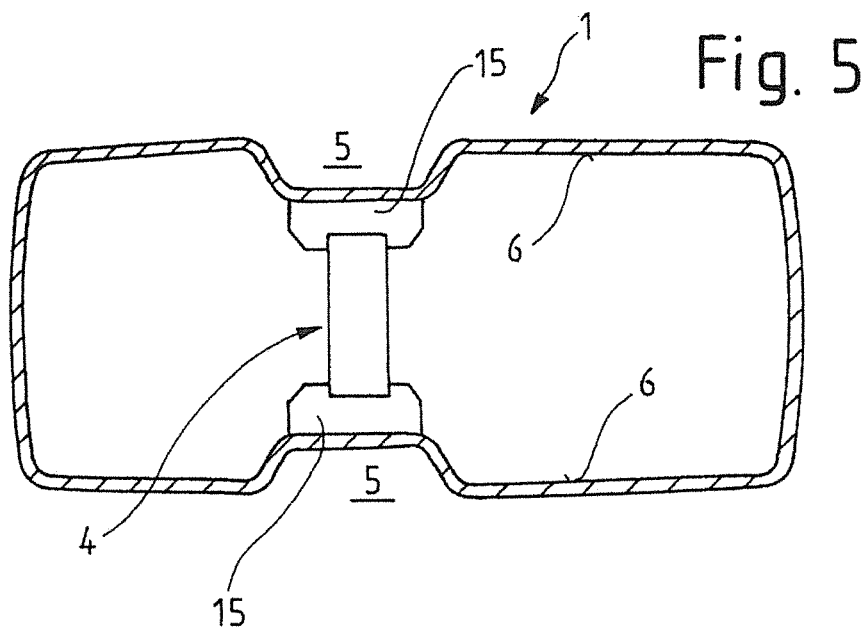
Figure 6:
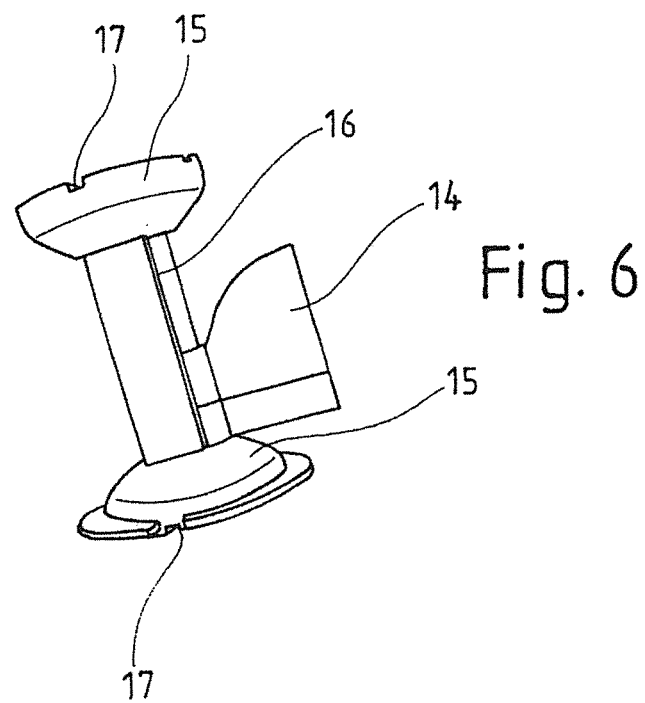

The invention is explained below by means of an illustrative embodiment shown in the drawings, in which:

FIG. 1: shows a partial section through a fuel tank according to the invention in the region of the arrangement of a supporting element, FIG. 2: shows a cross section through the supporting element according to the invention in accordance with lines II-II in FIG. 3, FIG. 3: shows a perspective view of the supporting element according to the invention, FIG. 4: shows a perspective view of a supporting element according to the invention with integrally formed baffle elements, FIG. 5: shows a sectioned view through a fuel tank according to the invention having one version of the supporting element, and FIG. 6: shows another version of the supporting element with a clipped-on baffle element.

The fuel tank 1 illustrated in the figures is composed substantially of thermoplastic material and comprises a top 2 and a bottom 3, between which at least one supporting element 4 extends. The supporting element 4 is of one-piece design and is welded at the ends to a wall of the top 2 and of the bottom 3, respectively.

In the version of the fuel tank 1 illustrated in FIG. 1, the supporting element is welded to the wall 6 of the top 2 in the region of a recess 5 in said wall and, in the region of the welding to the wall 6 of the bottom 3, said wall is of substantially smooth design.

The supporting element 4 is designed as a one-piece solid profile with ribs 7 extending in the longitudinal direction of the supporting element 4. This profile comprises a main body 8, which is composed of a relatively hard, brittle and torsionally rigid plastic.

At each end, the supporting element has welding surfaces 9, which are integrally formed and, for example, can be provided in the form of welding pads 10 at one end and in the form of a welding flange 11 at the other end. In the illustrative embodiment of the supporting element 4 which is shown in FIG. 3, welding pads 10 are provided on a supporting element at the end facing the top 2, and a welding flange 11 is provided on the end facing the bottom 3. The invention should be interpreted such that the supporting element 4 can have welding pads at both ends or welding flanges at both ends or can have a welding flange on the end facing the top 2 and welding pads on the end facing the bottom 3.

As an alternative, as illustrated in FIG. 4, the supporting element can be provided with welding ribs 12 at one or both ends.

As shown indicatively in FIG. 3, the supporting element 4 can have fastening tongues 13 for mounting baffle elements.

In the version of the supporting element illustrated in FIG. 4, this comprises two integrally formed baffle elements 14.

By way of example, the supporting element 4 can be composed of a polyamide or an ABS, while the welding pads 10 or the welding flange 11 or the welding ribs 12 can be composed of an HDPE or an LDPE, for example, which can be welded to the wall 6 of the fuel tank 1 based on HDPE.

In this case, the supporting element 4 can be designed as a two-component injection moulding, for example.

In the version of the fuel tank 1 according to the invention which is shown in FIG. 5, the supporting element 4 is arranged between two oppositely arranged dome-shaped recesses 5 in the top 2 and in the bottom 3 of the wall 6 of the fuel tank 1. This embodiment has the advantage, in particular, that the fuel tank 1 can be fitted with a plurality of supporting elements in such a way that the selected spacing between the supporting elements 4 is relatively large because the top 2 and the bottom 3 form an arched structure which allows an optimum flow of force between the supporting element 4 and the wall 6 or the top 2 and bottom 3. This arrangement has an increased load-bearing capacity for the same number of supporting elements.

In the illustrative embodiment shown in FIGS. 5 and 6, the supporting element 4 comprises a main body 8 and welding flanges 15 formed in one-piece with the main body 8. The ribbed structure of the main body 8 is not shown in these illustrations.

The main body 8 of the supporting element 4 is furthermore provided with at least one undercut fastening groove 16, into which one or more baffle elements 14 can be clipped or latched. The baffle elements have a mating profile of complementary design to the groove 16.

Reference is made once again to FIG. 3, which shows a perspective view of the supporting element 4 from above, wherein the supporting element 4 is provided with welding pads 10 which are arranged as partial ring segments on the end face of the main body 8. The welding pads 10 each form radially extending displacement channels 17, from which material at the melting temperature can be displaced during the welding of the welding pads 10 to the wall 6 of the top 2 or of the bottom 3.

A similar effect is achieved with the channels according to the illustrative embodiment in FIG. 4, which extend between the welding ribs 12.

Referring once again to FIG. 3, vent openings 18 are provided in the ends of the main body 8, said openings communicating with the interspaces between the ribs 7 of the main body 8, thus ensuring that any trapped gas escapes during the joining process or during welding and improving the reliability of the joining process.

19 denotes a groove in a baffle element 14 (see FIG. 4), into which, for example, a fuel line or vent line or the like laid in the fuel tank 1 can be clipped.

LIST OF REFERENCE SIGNS 1 fuel tank
2 top
3 bottom
4 supporting element
5 recesses
6 wall
7 ribs
8 main body
9 welding surfaces
10 welding pads
11 welding flanges
12 welding ribs
13 fastening tongues
14 baffle element
15 welding flanges
16 groove
17 displacement channels
18 vent openings
19 groove

The invention claimed is:

1. A fuel tank comprising:
the fuel tank made of thermoplastic material and having a tank top including a tank top wall and a tank bottom including a tank bottom wall,
wherein the tank top and the tank bottom are supported between one another via at least one column-shaped supporting element,
wherein the at least one column-shaped supporting element is connected to the tank top wall and the tank bottom wall and configured to absorb tensile forces from pressure within the tank,
wherein the at least one column-shaped supporting element is formed as a one-piece structure having a longitudinal length extending from the tank top wall to the tank bottom wall, wherein the longitudinal length extends along a longitudinal axis of the at least one column-shaped supporting element,
wherein the at least one column-shaped supporting element comprises a plurality of ribs,
which extend substantially parallel to each other along the longitudinal axis of the at least one column-shaped supporting element, and are connected to each other along the longitudinal length of the at least one column-shaped supporting element,
wherein the at least one column-shaped supporting element has a cross-sectional profile transverse to the longitudinal axis of the at least one column-shaped supporting element, and
wherein the cross-sectional profile of the at least one column-shaped supporting element transverse to the longitudinal axis of the at least one column-shaped supporting element is a solid profile.

2. The fuel tank according to claim 1, wherein:
the at least one column-shaped supporting element has a top end and a bottom end and at least one of the top end and the bottom end includes a welding surface.

3. The fuel tank according to claim 2, wherein:
the at least one of the top end and the bottom end having the welding surface includes at least one displacement channel configured to receive material during welding.

4. The fuel tank according to claim 2, wherein:
the welding surface includes a plurality of welding pads.

5. The fuel tank according to claim 4 wherein the plurality of welding pads are provided by end faces of a plurality of ring segments.

6. The fuel tank according to claim 4 wherein the plurality of welding pads are provided by end faces of a plurality of welding ribs.

7. The fuel tank according to claim 2, wherein:
the at least one of the top end and the bottom end having the welding surface further includes at least one vent opening passing through an end face thereof.

8. The fuel tank according to claim 2, wherein:
the welding surface has a welding surface area,
the at least one column-shaped supporting element has a maximum cross-sectional area transverse to the longitudinal axis of the at least one column-shaped, and
a ratio of the welding surface area to the maximum cross-sectional area of the at least one column-shaped supporting element is $\leq 1.5$.

9. The fuel tank according to claim 2, wherein:
the at least one column-shaped supporting element is made from at least two different plastics,
wherein the welding surface of the at least one of the top end and the bottom end is made from a thermoplastic material compatible for weldability with the at least one of the tank top wall and the tank bottom wall, respectively, whereas a main body of the at least one column-shaped supporting element is made from a relatively harder plastic.

10. The fuel tank according to claim 1, wherein:
the at least one column-shaped supporting element has at least one integrally formed baffle element.

11. The fuel tank according to claim 1, wherein:
the at least one column-shaped supporting element has at least one longitudinally extending groove profile or at least one fastening aperture, in which at least one baffle element is latched.

12. The fuel tank according to claim 11, wherein:
at least one baffle element is configured to fasten at least one of at least one internal fitting and at least one line of the fuel tank.

13. The fuel tank according to claim 1, wherein:
at least one of the tank top wall and the tank bottom wall includes a dome-shaped recess, and
the at least one column-shaped supporting element extends from the dome-shaped recess.

\* \* \* \* \*